(12) United States Patent
Alam (10) Patent No.: US 9,491,424 B2
(45) Date of Patent: Nov. 8, 2016

(54) SYSTEM AND METHOD USING SILICON COOLER FOR MOBILE PROJECTOR

(71) Applicant: Wireless Mobi Solution, Inc., San Diego, CA (US)

(72) Inventor: Mohammed Didarul Alam, San Diego, CA (US)

(*) Notice: Subject to any disclaimer, the term of this patent is extended or adjusted under 35 U.S.C. 154(b) by 51 days.

(21) Appl. No.: 14/524,471

(22) Filed: Oct. 27, 2014

(65) Prior Publication Data

US 2016/0119598 A1    Apr. 28, 2016

(51) Int. Cl.
*G03B 21/16* (2006.01)
*H04N 9/31* (2006.01)
*G03B 21/14* (2006.01)

(52) U.S. Cl.
CPC .......... *H04N 9/3173* (2013.01); *G03B 21/145* (2013.01); *G03B 21/16* (2013.01); *H04N 9/3144* (2013.01)

(58) Field of Classification Search
CPC .. H04M 1/0272; G03B 21/16; H04N 9/3144
See application file for complete search history.

(56) References Cited

U.S. PATENT DOCUMENTS

| | | | |
|---|---|---|---|
| 6,254,238 B1 | 7/2001 | Takamatsu | |
| 7,556,385 B2* | 7/2009 | Kitahara | F16M 11/16 348/787 |
| 8,111,028 B2 | 2/2012 | Rollins et al. | |
| 8,716,689 B2 | 5/2014 | Chen et al. | |
| 2002/0063855 A1* | 5/2002 | Williams | H04N 9/12 353/94 |
| 2006/0170885 A1* | 8/2006 | Kitahara | F16M 11/16 353/119 |
| 2006/0244926 A1* | 11/2006 | Shih | G03B 21/16 353/54 |
| 2010/0302463 A1* | 12/2010 | Matsumoto | G03B 21/16 348/744 |
| 2011/0037954 A1* | 2/2011 | Tsuchiya | G03B 21/16 353/54 |
| 2011/0242499 A1* | 10/2011 | Terao | G03B 21/16 353/57 |
| 2012/0197459 A1* | 8/2012 | Fukano | G03B 21/16 700/300 |

* cited by examiner

*Primary Examiner* — Bao-Luan Le
(74) *Attorney, Agent, or Firm* — Garrett James O'Sullivan; Timothy Marc Shropshire; MU Patents

(57) ABSTRACT

A system and its design variations using heat pump to generate useful warm and cool usages for multi functional mobile projector is exposed; the purpose is two folds: first is to reduce the excessive heat, in order to increase the brightness; the second is to reuse the energy, so to extend the functionalities. The key component used is silicon based heat pump, which can convert the electrical energy to heat energy. Different shaped heat or cool fins are designed to match the multiple use cases. One sample implementation using digital serial interface is described in details.

7 Claims, 7 Drawing Sheets

Waterproof foldable tri-pod used to heating and cooling

One metal (gold, silver, aluminum, copper, titanium, platinum, etc) handle heat radiator.

Fig.1

Waterproof foldable tri-pod used to heating and cooling

Sensor senses temperature, actuator 1~5 cooling, actuator 1'~5' heating

SYSTEM AND METHOD USING SILICON COOLER FOR MOBILE PROJECTOR

FIELD OF THE INVENTION

The present patent application generally relates to cooling technologies and more specifically to a system and a method using silicon cooler for mobile projector, to reduce the heat, and increase the brightness.

BACKGROUND

Heat is the main issue, preventing the mobile projector to increase the brightness, the heat from the LED light, from the DMD driver, from the battery etc. There are lots of inventions, such as, using the fan to cool circuits down, the ones made from Thermal diode device[1] and used for video projector[2]. However, all these patents are traditional cooling systems, where there are always some moving parts that have limited life span. With silicon cooler scheme, not only the moving parts are eliminated, but also the space is saved.

With the past surge of the commercialization of the mobile devices, the continuing expansion of visible light sensors and the increasing usage of multimedia applications, the projection demand has seen a steady increase. Researchers are diligently working towards disruptive technology that has not previously been given substantial attention, including visible light projection, virtual keyboard, virtual mouse and virtual pen applications, 3D scanner etc.

As an essential requirement for projection systems, brighter mobile devices with coordinated cooler pairs have been developed. The conventional projector system needs high noise fan system, the new system utilize the distributed silicon diode, which can move the heat around with out any noise. This eliminates the noise, remove the holes, and allow water proof design as well.

In addition, it can be used in the similar mobile devices as well.

SUMMARY

Considered broadly, a system for air cooling or water cooling with silicon thermal diode comprises a heating device, at least one cooling device, which is configured to communicate with each of the at least one temperature sensor device, to determine a current environment between the lighting device and the printed circuit board, and to control the operating mode of the inside cooling device according to the outside heating environment. The projecting device is configured to sense the environment conditions such as wet or dry through at least one of the humidity sensor, to detect if water coolant is available. The cooling device and each of the heating devices is configured to perform heat pump of projecting to form the automated cooling system, and to form a water cooler, to cool down the water. The heating device and each of the cooling devices is configured to form a water warmer, to warm up the water. The projecting device and mobile charging device are configured to deal with the charging and projecting at the same time. The projecting device is made of water proof material. The device standing on a tri-pod consists of one cold leg and two hot legs. The stand alone projecting device is paired up with any smart phone with related application to form the projecting system.

DETAILED DESCRIPTION

Reference will now be made in detail to a preferred embodiment of the system and the method for silicon cooler with intelligent mobile device disclosed in the present patent application, examples of which are also provided in the following description. Exemplary embodiments of the system and method disclosed in the present patent application are described in detail, although it will be apparent to those skilled in the relevant art that some features that are not particularly important to an understanding of the system and method may not be shown for the sake of clarity.

Furthermore, it should be understood that the system and method disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Embodiments of the present patent application described hereafter present an active temperature sensor system coupled with the cooler actuators. The exact mobile devices for this purpose in the network have been developed. Silicon cooling end and heating end pairs are used to fulfill this localized temperature control task, since the conventional fan system has only static information[3].

Temperature balance techniques are provided according to one broad aspect of the present patent application and may be used on top of such solutions as water proof design for cup holder warm or cool application, to just enhance the user experience.

Figure 1:
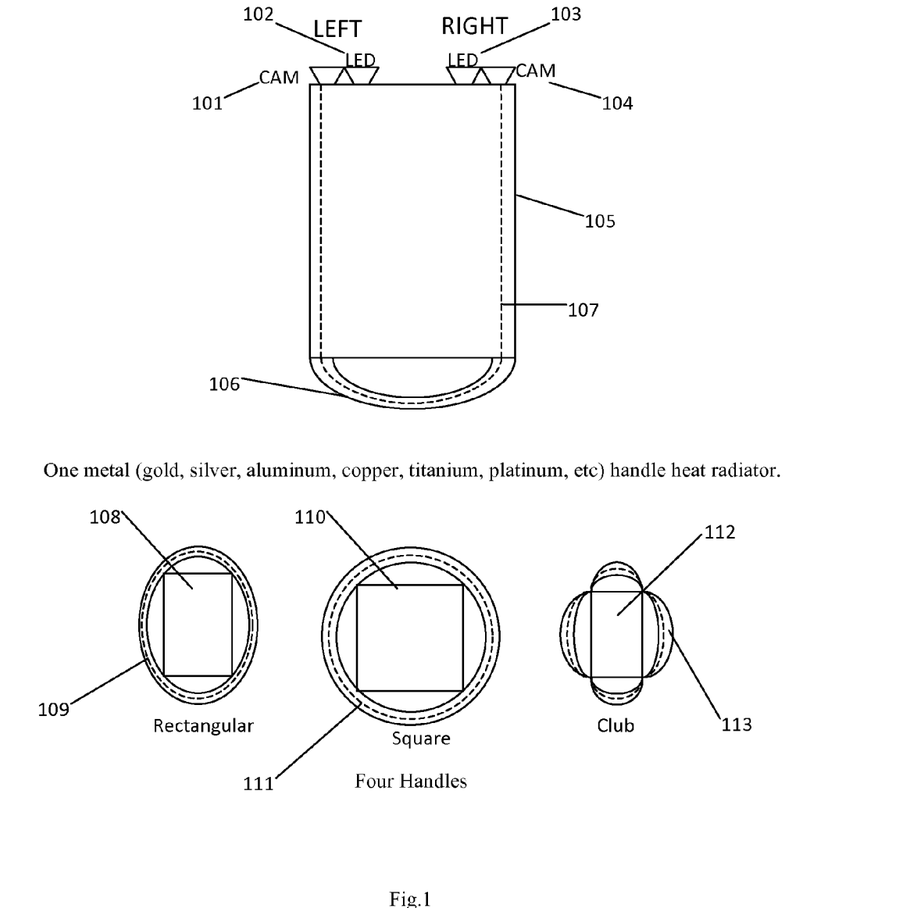
FIG. 1 is a diagram illustrating a hardware system that implements a one or four handle(s) shaped cooler for intelligent mobile device in accordance with an embodiment of the present patent application.

With reference to FIG. 1, a handle 106 is added to a typical projector 105 including a pair of left and right LED and cameras (labeled 101~104). The material of the radiator 107 in handle 106 could be gold, silver, aluminum, copper, titanium, platinum, etc. The figure of handle 108 for rectangular projector 109 is shown on the left; the figure of handle 110 for square projector 111 is shown in the middle; the figure of club handle 112 for projector 113 is shown on the right.

Figure 2:
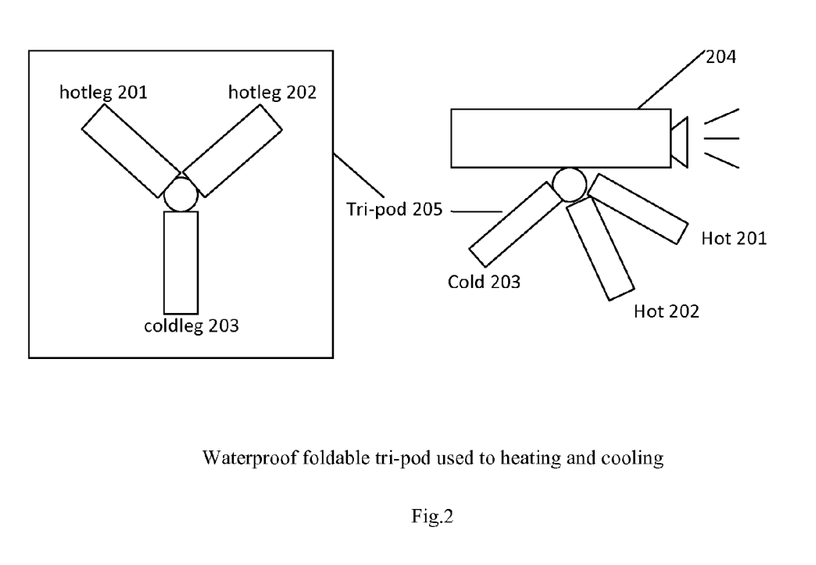
FIG. 2 is a diagram illustrating a hardware system that implements a three leg shaped cooler for intelligent mobile device in accordance with an embodiment of the present patent application.

With reference to FIG. 2, a waterproof foldable tri-pod 205 (shown on the left) is made up of two hotlegs 201/202 and a coldleg 203. The working status on a projector 204 is shown on the right.

Figure 3:
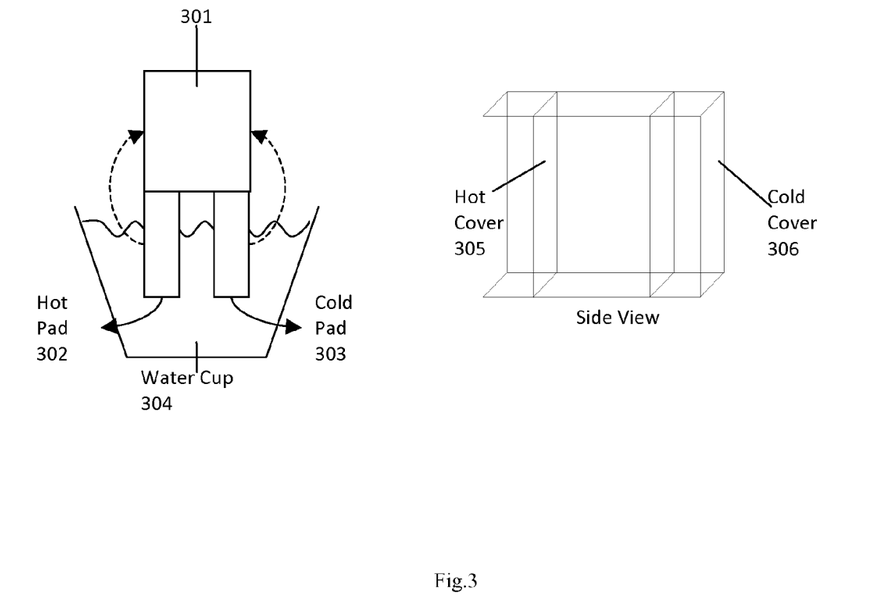
FIG. 3 illustrates two flip shaped to form one cold and one hot pad for usage as a water proof cup coast, to cool or warm the object or itself.

With reference to FIG. 3, two flips form a hot pad 302 and a cold pad 303 to cool or warm an object 301 in water cup 304. The right side shows the side view of the two flips, with hot cover 305 and cold cover 306 respectively.

Figure 4:
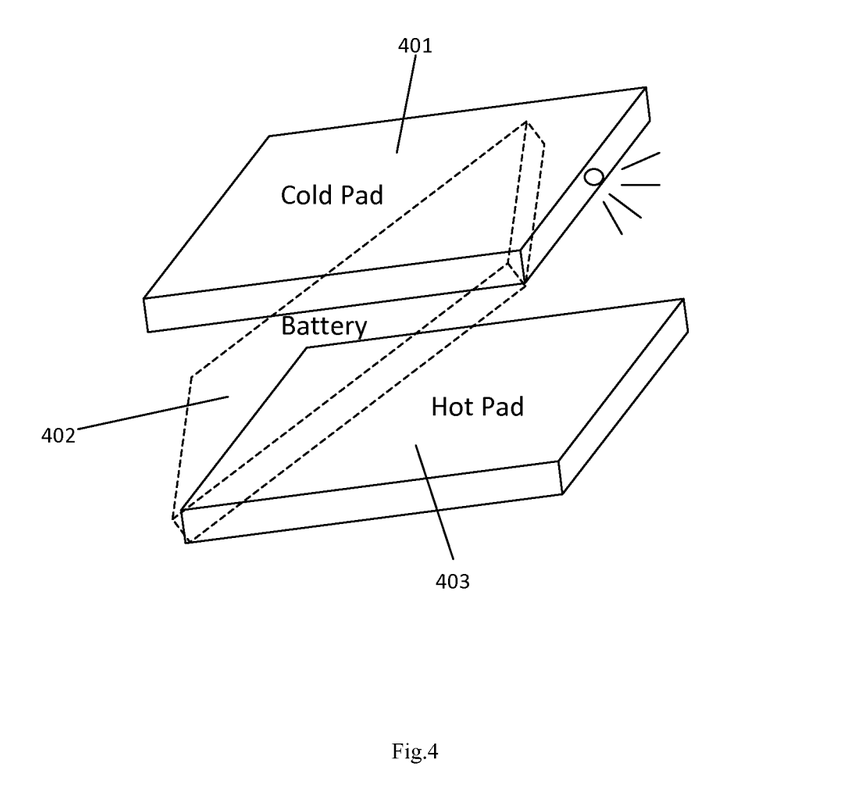
FIG. 4 illustrates a projector combined with the secondary mobile battery charge with z shaped stander.

With reference to FIG. 4, a projector having cold pad 401 and hot pad 403 is combined with a secondary mobile battery charge 402.

Figure 5:
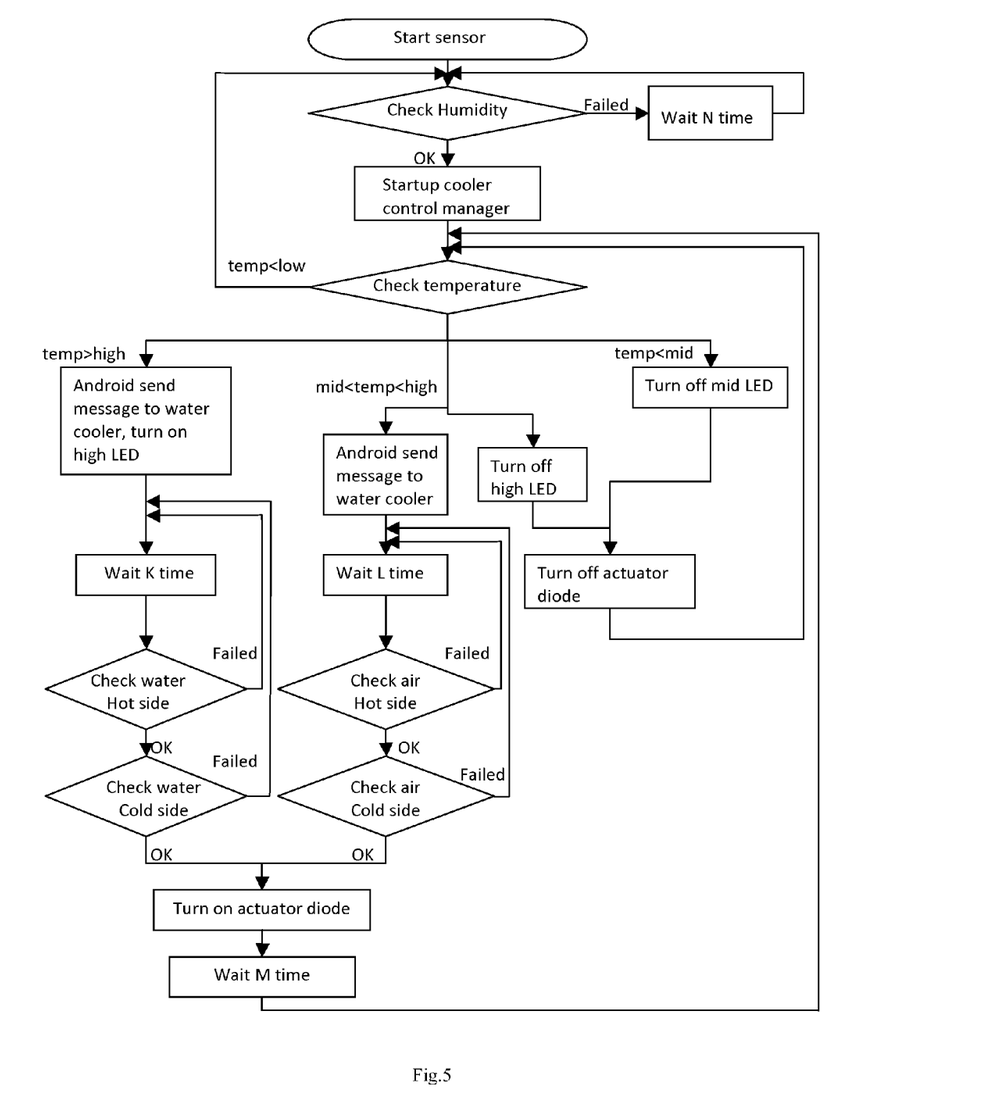
FIG. 5 illustrates the software flow diagram of the projector.

With reference to FIG. 5, the software flow diagram illustrates a typical cooling procedure. First of all, certain humidity requirements must be met, otherwise wait until met. Once met, startup cooler control manager to prepare for cooling. Then check temperature regularly. If temperature is very high or moderately high, turn on actuator to cool and turn on corresponding display LED; if temperature is moderately low, turn off overheat warning display LED and actuator diode to stop cooling; if temperature is abnormally low, go back to the very beginning to check if humidity requirements still met.

Figure 6:
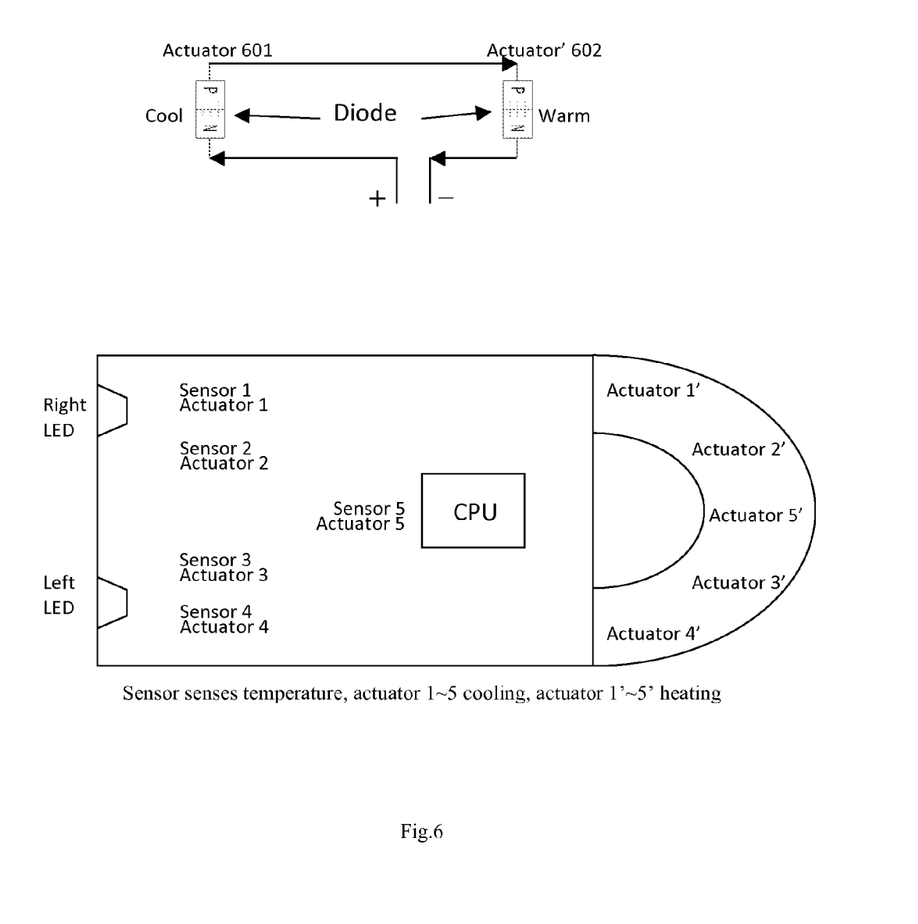
FIG. 6 illustrates the hardware block diagram of the silicon cooler.

With reference to FIG. 6, a projector with a pair of actuators used as silicon cooler is demonstrated. The upper part shows that actuator 601 is connected from positive electrode to actuator' 602, then back to negative electrode. The lower part explains that the silicon cooler is made up of several pairs of sensors and actuators. In each pair, sensor N senses temperature, actuator N used for cooling and actuator N' used for heating.

Figure 7:
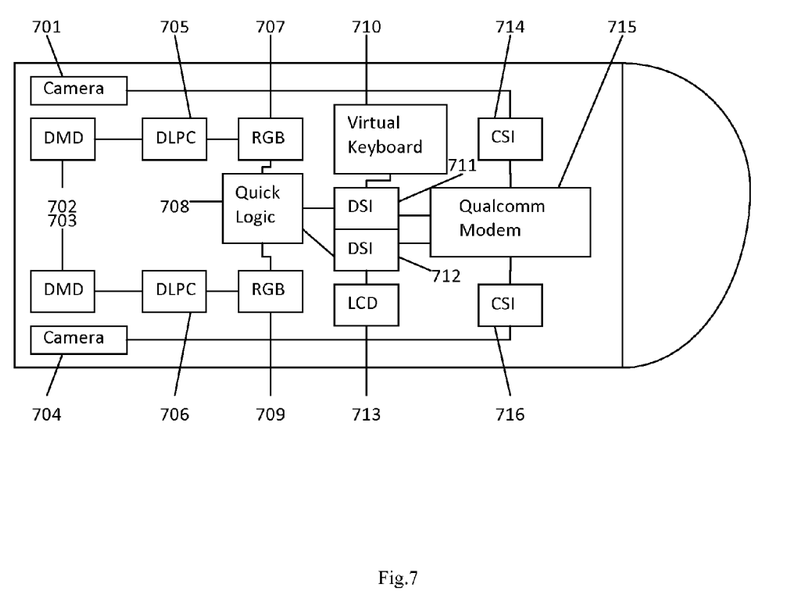
FIG. 7 illustrates the PCB drawing of the mother board with major DSI/CSI connectors.

With reference to FIG. 7, camera 701 and 704 is connected to Qualcomm modem 715 through CSI 714 and 716 respectively. Two DSI outputs 711 and 712 from Qualcomm modem 715 are connected to virtual keyboard 710 and LCD 713 respectively. Meanwhile, DSI outputs 711 and 712 are transformed to RGB format 707 and 709 by QuickLogic interface 708. Then RGB signal 707 and 709 is transmitted to DMD 702 and 703 under the control of DLPC 705 and 706, respectively.

An embodiment of the present patent application involves extending traditional cooler to warmer or even projector for comprehensive usability. The multi-function concept may be used in temperature control devices to enable the self stander at the same time.

According to an embodiment of the present patent application, the final temperature is adjusted to effectively reach a compromise between battery performance and the brightness. For example, different season can be associated with different level of temperature.

Implementations of the embodiments of the present patent application disclosed herein may also be useful for future Internet of Things communication, where unattended sensors need temperature controlling by the machine itself.

The silicon cooler principles disclosed herein are also substantially independent of system architecture and may be used for virtually all embedded devices need the temperature control.

One basic rule which could be implemented in accordance with an implementation of the embodiments of the present patent application is when the temperature becomes too high, water can be used to as the coolant.

The specific type of each component will be implementation-dependent. The particular structure and operation of the cool-hot pairs may be different for different formats of mechanical designs.

In addition, the present patent application is in no way restricted to implementation with mobile devices or other types of device having the specific structure shown in the drawings. Different or fewer components, with different sensor and actuator interconnections, may be used in a device in which an implementation of the present patent application can be done.

According to another embodiment, a single device incorporates both portable charger, cooler, or warmer, with the projecting devices, can be built to form the said multi-function products with any smart phone, with corresponding applications, to fulfill the bright projector applications.

In one proto-type system, part of the projector is sourced from TI DLP6401 processor, the coloring flash is provided by QuickLogic DSI-RGB bridge, both WiFi and LTE is from Qualcomm, the cooling warming thermal diode pair is from Maxim.

Many different types of implementation and realization of the present patent application are possible, e.g. The camera can be included to detect the human eyes, once the eye is detected, the brightness is lowered immediately to protect human from fainting side effect.

Other different types of implementation and realization of the present patent application are possible, e.g. The thermal diode can be included to detect the temperature on PCB, once the hot spot is detected, the heat pump is kicked off to move the heat to outside radiation handle or legs immediately to protect PCB heat sick for LED light from over heat.

Components or devices described as hardware above may alternatively be implemented partially in application software. Similarly, method steps disclosed herein may be performed by hardware or implemented in software code.

The embodiments effectively eliminate the fan cool noise, and allow the water cool of legs as an option. It does so with the sensor actuator feedback pair. The unique water cool methodology is optimized for projector on built in tri-pod. All embedded feedback controlling firmware system implementations are supported, with humidity sensors.

While the present patent application has been shown and described with particular references to a number of embodiments thereof, it should be noted that various other changes or modifications may be made without departing from the scope of the present invention.

What is claimed is:

1. A system for air cooling or water cooling a projector comprising:
    a. a heating device;
    b. at least one distributed silicon thermal diode;
    c. a lighting device;
    d. a printed circuit board;
    e. at least one temperature sensor device determines a current environment between the lighting device and the printed circuit board; and
    f. at least one cooling device, wherein the cooling device is configured to form a water cooler, to cool down the water, the at least one cooling device having an operating mode configured to communicate with the at least one temperature sensor device, wherein the at least one temperature sensor controls the operating mode, wherein the heating device and the at least one cooling device adjust the temperature of the projector according to the ambient temperature, wherein the cooling device and the heating device comprise one or more legs of a tri-pod, wherein the tripod comprises at least one cold leg and at least one hot leg, wherein the cold leg decreases the temperature of the water, and wherein the at least one hot leg increases the temperature of the water.

2. The system of claim 1, further comprising at least one humidity sensor configured to sense environment conditions to detect if water coolant is available.

3. The system of claim 2, wherein the cooling device and the heating device are configured to perform heat pump for the projector to form an automated cooling system.

4. The system of claim 3, wherein the projector and a mobile charging device are configured to deal with the charging and projecting at the same time.

5. The system of claim 3, wherein the projector is made of the water proof material.

6. The system of claim 1, wherein the heating device is configured to form a water warmer, to warm up the water.

7. The system of claim 1, wherein the projector is paired up with a smart phone with related application to form the projecting system.

* * * * *